Patented May 14, 1935

2,001,639

UNITED STATES PATENT OFFICE 2,001,639

SILVER SOLDER

Harold Turner, Sheffield, England, assignor to Johnson Matthey & Company Limited, London, England, a British company No Drawing. Application January 26, 1934, Serial No. 708,499. In Great Britain March 17, 1933

3 Claims. (Cl. 75—1)

This invention relates to the manufacture, preparation and production of solders for use in joining metals and alloys and particularly silver alloys having greater resistance to tarnish than the ordinary copper-silver alloys. Such alloys are free, or almost free, from copper and may contain zinc, cadmium, antimony, tin, manganese or other metal which may reduce the tendency of silver to tarnish in the atmosphere. In order to provide a solder suitable for joining pieces of the said type of silver alloy it is necessary to use a solder which itself is at least as resistant to tarnish as the pieces to be joined.

I have now found that such solders especially suitable for joining tarnish-resisting silver alloys may be produced by alloying silver with tin and zinc, in suitable proportions to obtain a solder which has good tensile strength in the joint and similar resistance to tarnish to the silver alloy joined, as well as a sufficiently low melting point.

According to this invention solders especially suitable for joining tarnish-resisting silver alloys comprise from 60 to 85 per cent of silver, from 1 to 9 per cent of tin, and from 15 to 30 per cent of zinc.

I have obtained excellent results with solders approximating to the percentage compositions given in the two following examples.

|  | Example 1 | Example 2 |
| --- | --- | --- |
| Silver | 83 | 80. |
| Tin | 2 | 3. |
| Zinc | 15 | 17. |
| Melting complete at | 800° centigrade | 760° centigrade. |
| Melting commences at | 760° centigrade | 728° centigrade. |
| Plastic range | 40° centigrade | 32° centigrade. |

Although these solders are especially intended for use with tarnish-resisting silver alloys it is to be understood that these solders are equally suitable for all purposes for which ordinary silver solders are used but they have the advantage over the latter of being more resistant to tarnish during prolonged exposure to the atmosphere.

In preparing solders according to this invention the necessary quantity of silver is first melted under a layer of wood charcoal or borax or other suitable flux, the zinc added and the temperature allowed to fall to just above the melting point. Tin is then added until the desired amount is present in the alloy. The whole is then stirred well and cast into ingots which can be rolled to the necessary size and thickness. It is to be understood that it is not necessary to adhere strictly to the sequence given for the addition of the various metals when being introduced into the molten silver but speaking generally they are added in the order of the melting points, that with the highest melting point being first.

What I claim is:—

1. A silver solder especially suitable for joining tarnish-resisting silver alloys which consists of 60 to 85% of silver, the following metals in the proportions as stated; 1 to 9% of tin and 15 to 30% of zinc.

2. A silver solder composed of 83% of silver, 2% of tin and 15% of zinc.

3. A silver solder composed of 80% of silver, 3% of tin and 17% of zinc.

HAROLD TURNER.